United States Patent
Larsson

(10) Patent No.: US 9,938,159 B2
(45) Date of Patent: Apr. 10, 2018

(54) DEVICE INCLUDING A COMPACT SPRAY NOZZLE FOR CLEANING A FILTER CLOTH IN A DISC FILTER

(75) Inventor: Per Larsson, Trelleborg (SE)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 285 days.

(21) Appl. No.: 13/879,256

(22) PCT Filed: Oct. 7, 2011

(86) PCT No.: PCT/SE2011/051205
§ 371 (c)(1),
(2), (4) Date: Apr. 12, 2013

(87) PCT Pub. No.: WO2012/053959
PCT Pub. Date: Apr. 26, 2012

(65) Prior Publication Data
US 2013/0213876 A1    Aug. 22, 2013

(30) Foreign Application Priority Data
Oct. 21, 2010 (SE) ........................ 1051094

(51) Int. Cl.
| | | |
|---|---|---|
| *B01D 33/21* | (2006.01) | |
| *B01D 33/15* | (2006.01) | |
| *B01D 33/23* | (2006.01) | |
| *B01D 33/25* | (2006.01) | |
| *C02F 1/00* | (2006.01) | |
| *B01D 33/46* | (2006.01) | |

(52) U.S. Cl.
CPC .............. *C02F 1/001* (2013.01); *B01D 33/15* (2013.01); *B01D 33/21* (2013.01); *B01D 33/215* (2013.01); *B01D 33/23* (2013.01); *B01D 33/25* (2013.01); *B01D 33/463* (2013.01); *B01D 33/155* (2013.01)

(58) Field of Classification Search
CPC ................................................ B01D 33/463
See application file for complete search history.

(56) References Cited

U.S. PATENT DOCUMENTS

| | | | | |
|---|---|---|---|---|
| 1,804,934 A | * | 5/1931 | Hoyt | .............. 210/327 |
| 3,426,907 A | * | 2/1969 | Stone | ............. 210/332 |
| 5,968,372 A | | 10/1999 | Martensson et al. | |

(Continued)

FOREIGN PATENT DOCUMENTS

| | | |
|---|---|---|
| GB | 726565 | 3/1955 |
| KR | 100911215 | 8/2009 |

(Continued)

OTHER PUBLICATIONS

Moon, Machine Translation of KR100916327, 2009.*

(Continued)

*Primary Examiner* — Bobby Ramdhanie
*Assistant Examiner* — Jonathan Peo
(74) *Attorney, Agent, or Firm* — Coats & Bennett PLLC

(57) ABSTRACT

A device is provided for cleaning a filter cloth that forms a part of a filter element in a rotary disc filter. The device includes a flush tube and a spray nozzle operatively connected to the flush tube for receiving a cleaning fluid from the flush tube and directing the cleaning fluid onto the filter cloth.

12 Claims, 3 Drawing Sheets

(56) References Cited

U.S. PATENT DOCUMENTS 6,833,077 B2 * 12/2004 Flanagan ..................... 210/772
2004/0094470 A1    5/2004 Jackson

FOREIGN PATENT DOCUMENTS

| KR | 100916327 B | 9/2009 | | |
|---|---|---|---|---|
| WO | 0037159 A1 | 6/2000 | | |
| WO | WO 2008103106 A1 * | 8/2008 | ............. | B01D 33/21 |

OTHER PUBLICATIONS

Blumenbecker, "Machine Translation of DE9319221U", 1994, 20 total pages.*
Moon, "Machine Translation of KR100911215", 2009, 22 total pages.*
"Google Translate of DE9319221", Obtained from Web at translate.google.com, Dec. 9, 2016, 4 total pages.*

\* cited by examiner

DEVICE INCLUDING A COMPACT SPRAY NOZZLE FOR CLEANING A FILTER CLOTH IN A DISC FILTER

This application is a U.S. National Stage Application of PCT Application No. PCT/SE2011/051205, with an international filing date of Oct. 7, 2011. Applicant claims priority based on Swedish Patent Application No. SE 1051094-9 filed Oct. 21, 2010. The subject matter of these applications is incorporated herein in their entirety.

TECHNICAL FIELD OF THE INVENTION

The present invention relates to a device for cleaning a filter cloth of at least one filter element in a rotary disc filter, comprising at least one flushing tube, the centre axis of which is located essentially between two adjacent parallel filter elements, and which includes at least one outlet arranged in a direction other than towards the respective filter cloth, and at least one spray nozzle connected to said outlet.

BACKGROUND ART

In WO 00/37159, a disc filter is described in which liquid is passed through one end of a rotary drum and on through openings in the periphery of the drum, radially outwards to at least one filter element. Each filter element includes a filter frame, which is covered by filter cloth on either side of the filter frame. The disc filter also includes a flushing ramp, which extends parallel to the centre axis of the disc filter, outside the outer edge of the disc filter. From the flushing ramp, a number of smaller flush tubes extend in a radial direction. The flush tubes are inserted between parallel filter elements. Pressurised cleaning fluid is sprayed through the flushing ramp and the flush tubes, out through at last one spray nozzle towards the surface of the filter cloth, in a direction opposite the filtering direction, to clean away possible accumulations from the filter cloth. The accumulations are flushed back inside the filter element and passed to a trough, which diverts the accumulations. The spray nozzles may be arranged directed towards two parallel filter elements for simultaneous cleaning of the filter elements.

A flushing device of this type requires that the nozzles are placed at a certain distance from the filter cloth, such that sufficient diffusion of the cleaning fluid is achieved to give sufficient cleaning effect, especially in more clogged-up areas of the filter cloth.

In order to have room for inserting a flush tube and at the same time efficiently cleaning two parallel filter elements by placing the nozzles at said distance, it is necessary that the filter elements are arranged spaced a certain distance from each other.

SUMMARY OF THE INVENTION

An object of the present invention is to provide a flushing device for a disc filter, which efficiently cleans the filter elements and which exhibits a compact construction, such that it may be inserted in the space between two parallel filter elements. This space is decisive for how many filter elements can be arranged along a certain length of the disc filter and an additional object of the invention is to increase the capacity of the disc filter by reducing this space. According to an embodiment of the invention, these and other objects are achieved by a device for cleaning a filter cloth of at least one filter element in a rotary disc filter, comprising at least one flush tube, the centre axis of which is located essentially between two adjacent parallel filter elements and comprising at least one outlet arranged in a direction other than towards the respective filter cloth, and at least one spray nozzle connected to said outlet, wherein the connection to the spray nozzle extends essentially parallel to said filter element, characterised in that the spray nozzle includes an angled redirecting channel for distribution of cleaning fluid in a direction towards the filter cloth of said filter element, and in that a plurality of spray nozzles are arranged in pairs around the flush tube and with their respective outlet openings located at a distance from the respective filter element which is larger than half the spacing between two adjacent parallel filter elements. The spray nozzles arranged in pairs with their respective outlet openings at a distance from the respective filter element which is larger than half the space between two adjacent parallel filter elements lead to that a plurality of filter cloths or a larger portion of a filter cloth may be cleaned at the same time.

The spray nozzle may be arranged directly against the flush tube, but preferably the connection is part of an adapter, which at least partially extends around the flush tube, wherein the spray nozzle is detachably arranged on the adapter. Hereby, the spray nozzle may easily be detached and cleaned when needed.

The outlet may be arranged through the far side of the flush tube in relation to said filter cloth, in order to make it possible for the distance to the filter cloth to be increased in comparison to an outlet arranged on the front of the flush tube.

The adapter advantageously includes a redirecting channel for passing the cleaning fluid from said outlet to said connection, wherein the flow direction of the cleaning fluid is changed and led into the spray nozzle for distribution of cleaning fluid in said direction towards the filter cloth.

The outlet opening of the spray nozzle is preferably located essentially behind the centre axis of the flush tube, in relation to said direction towards the filter cloth, which further increases the possibility of reducing the distance between the filter elements.

Advantageously, at least one flush tube is movable through an area which is defined by the circumference of the filter element. Hereby, it is possible to clean all surfaces of all filter elements. The disc filter comprises a plurality of filter elements, which leads to a more effective disc filter, since a larger volume of liquid may be filtered simultaneously.

The space between two adjacent filter elements is less than 16 cm, and preferably less than 12 cm. In known disc filters, 16 cm is normally a smallest distance between filter elements in the disc filter. With this device, the distance between the filter elements may be decreased, which leads to a disc filter with increased capacity at a maintained length of the disc filter, or, alternatively, a shorter disc filter at maintained capacity. Advantageously, said outlet opening of the respective spray nozzle is arranged between 7 and 8 cm from the respective filter cloth. At this distance, the cleaning is rendered effective with an appropriate diffusion and an appropriate pressure of the cleaning fluid.

BRIEF DESCRIPTION OF THE DRAWINGS

The invention will now be described in more detail in the following with reference to the appended schematic drawings, which by way of example show currently preferred embodiments of the invention.

DETAILED DESCRIPTION OF PREFERRED EMBODIMENTS OF THE INVENTION

The basic principle of a disc filter is that the fluid to be filtered is led in through one end of a central, rotary drum, and on through openings in the periphery of the drum, radially outwards to at least one filter element. The filter element is made up of a frame on which a filter cloth is arranged on either side of the frame. The liquid thus flows in between two filter cloths and is led from there in a filtering direction out through each filter cloth. Any particles in the liquid are caught on the inside of the filter cloth.

Figure 1:
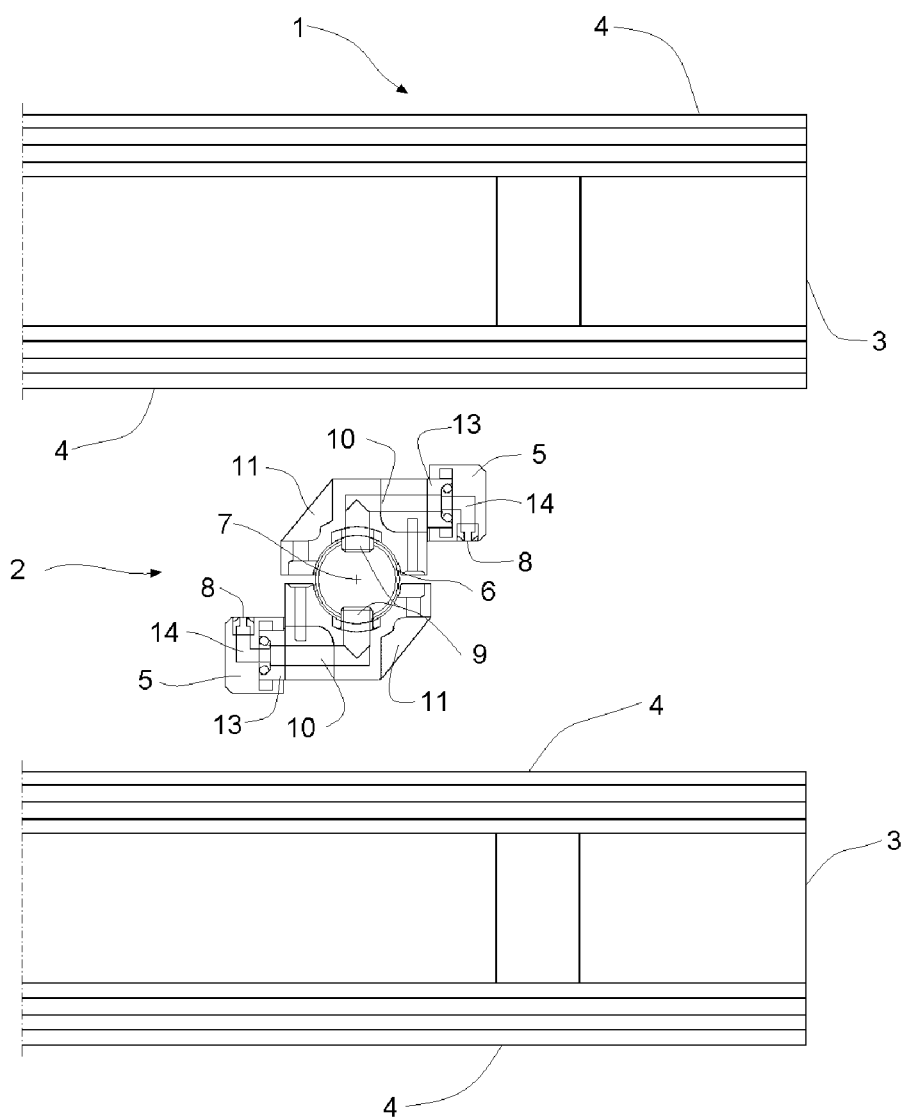
FIG. 1 is a sketch, which schematically shows a device located between two parallel filter elements of a disc filter and constructed in accordance with the invention.
Figure 2A:
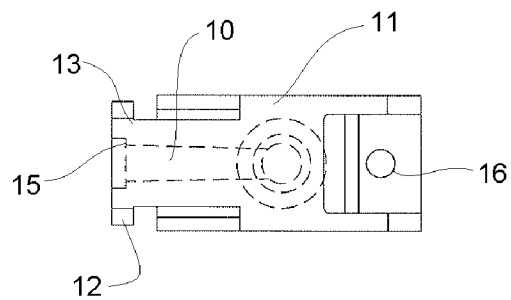
FIGS. 2a-d are side views of an adapter shown in FIG. 1 and a spray nozzle.
Figure 2B:
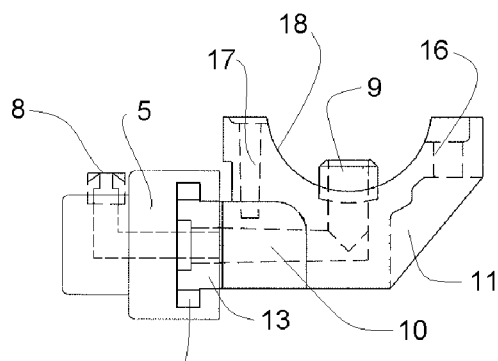
Figures 2C, 2D:
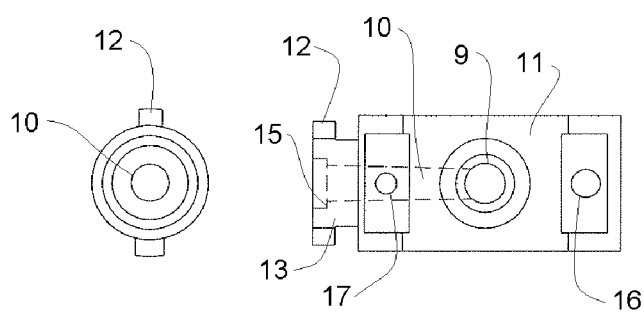
Figure 3:
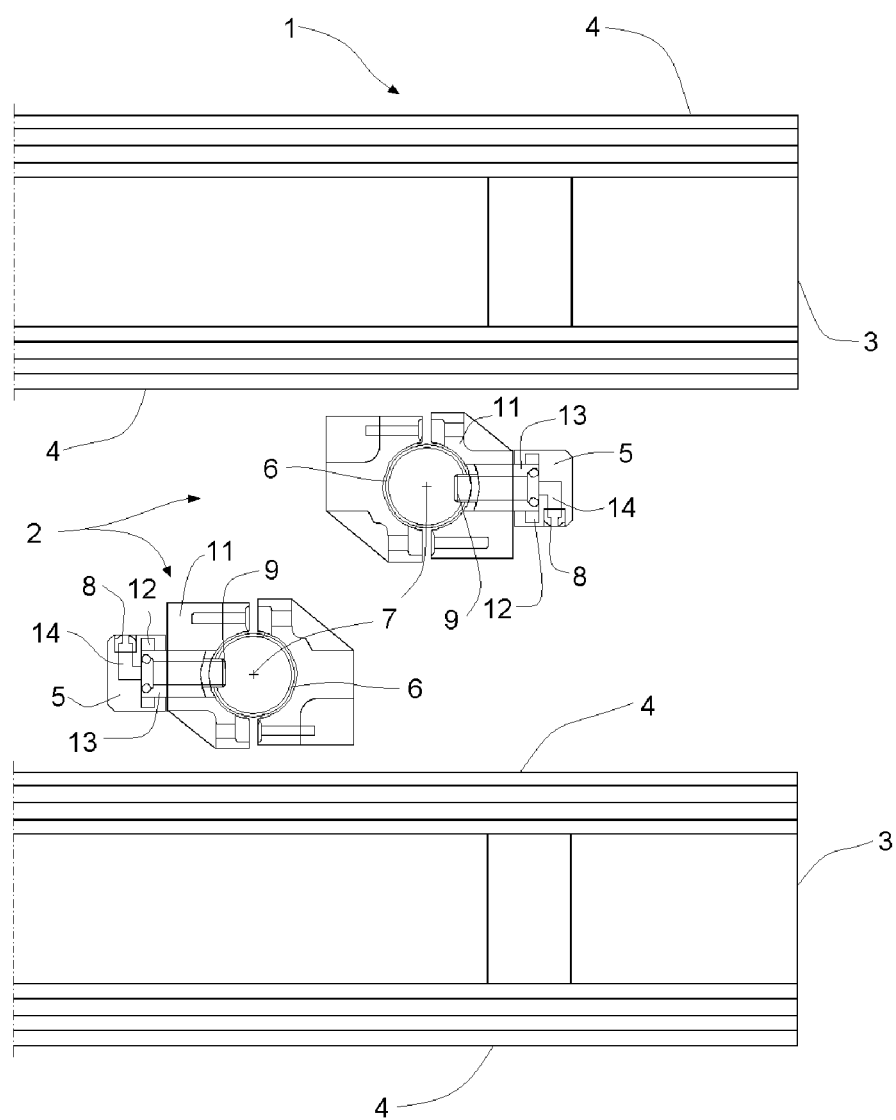
FIG. 3 is a sketch, which schematically shows a device with two flush tubes alternatively placed between two parallel filter elements of a disc filter in accordance with the invention.

In FIGS. 1 and 3 part of a disc filter 1 is shown comprising a cleaning device 2. A pressurised cleaning fluid is passed through the cleaning device 2 and sprayed onto a filter cloth 4 of a filter element 3, in a direction opposite the filtering direction, in order to clean off any accumulations from the filter cloth 4. The accumulations are flushed back inside the filter element 3 and led to a trough (not shown), which diverts the accumulations.

The cleaning device 2 of the present invention for cleaning the filter cloth 4 of at least one filter element 3, in the rotary disc filter 1, comprises at least one flush tube 6, the centre axis 7 of which is located essentially between two adjacent parallel filter elements 3, and comprises at least one outlet 9 arranged in a direction other than towards the respective filter cloth 4, and at least one spray nozzle 5 connected to said outlet 9, wherein the connection 13 to the spray nozzle 5 extends essentially parallel to said filter element 3, and the spray nozzle comprises an angled redirecting channel 14 for distribution of cleaning liquid in a direction towards the filter cloth 4 of said filter element 3.

The spray nozzle 5 may be arranged directly on the flush tube 6, but preferably the connection 13 is part of an adapter 11, which at least partially extends around the flush tube 6, the spray nozzle 5 being detachably arranged on the adapter 11.

According to a preferred embodiment, the cleaning device 2 is made up of at last one spray nozzle 5. One or a plurality of spray nozzles 5 may be arranged on one or more flush tubes 6. The spray nozzles 5 may be directed in the same or different directions, depending on the current need. The outlet opening 8 of the spray nozzle 5 may preferably be arranged between 7 and 8 cm from the filter cloth, the stream of cleaning liquid from the spray nozzle 5 covering a sufficient portion of the filter cloth 4.

The flush tube 6 with the spray nozzle 5 may be moved parallel to a radial plane of the filter element 3, i.e. within the area the outer edge of which is defined by the periphery of the filter element 3.

The flush tube 6 is in turn arranged on a flushing ramp (not shown). The flushing ramp extends parallel to the centre axis (not shown) of the disc filter 1, outside the periphery of said at least one filter element 3. At least one flush tube 6 extends from the flushing ramp and is rotatably arranged in order to be able to be pivoted in between two parallel filter elements 3, the spray nozzle 5 preferably being arranged perpendicularly to the surface of the filter cloth 4. Alternatively, the spray nozzle 5 may be arranged at another angle to the surface of the filter cloth 4. The outlet opening 4 may also, in some embodiments, be directed at another angle to the filter cloth 4.

The filter elements of a disc filter are usually arranged with a spacing of more than 16 cm. According to a preferred embodiment, this spacing is reduced, preferably to less than 12 cm. In known disc filters, the flush tube has a diameter of about 2 cm, and with a spacing of 7 cm between the respective outlet opening and the surface of the filter cloth a spacing between two parallel filter elements of at least 16 cm is required.

As may be seen from FIG. 1, an outlet opening 8 of the spray nozzle 5 is essentially located behind the centre axis 7 of the flush tube, in relation to said direction towards the filter cloth 4. By placing the outlet openings 8 behind the centre axis 7 of the flush tube 6, according to the present embodiment, the spacing may be reduced to about 12 cm, and in the example shown, the distance is about 11 cm. Hereby, a known disc filter which previously comprised 24 filter elements may, for instance, be expanded to comprise 30 filter elements with a maintained length of the disc filter. Through the present invention it is thus possible to increase the capacity of the disc filter further, which was earlier not possible, since the length of the drum of the disc filter is limiting the maximum length of the disc filter.

As may be seen from FIG. 1, an adapter 11 for the respective spray nozzle 5 is arranged at least partially around the flush tube 6 and comprises an outlet 9 arranged through the far side of the flush tube 6 in relation to the respective filter cloth 4. A redirecting channel 10 extends through the adapter 11 and leads the cleaning liquid from said outlet 9 to said connection 13. The nozzle 5 comprises a curved channel 14, which leads to an outlet opening 8, which is located behind the centre axis 7 of the flush tube 6, as may be seen from FIG. 1, in relation to the surface of the filter cloth 4. The outlet opening 8 in itself is advantageously integrated in the spray nozzle 5, which is detachably attached to the adapter 11, in order to be more easily cleaned or exchanged if needed. Suitably, two analogous adapters 11 are mounted to each other around the flush tube 6 by means of screws or similar means. Naturally, they may also be permanently joined together or with the flush tube 6 by gluing or similar. The adapter 11 is preferably made of a plastic material, and the nozzle 5 may be made of plastic and preferably comprises a ceramic material in the actual outlet opening 8. The flush tube 6 may be made of plastic or metal.

In FIGS. 2a-2d, the construction of the adapter 11 of FIG. 1 may be seen more clearly. The redirecting channel 10 extends from the outlet 9 to the connection 13, and on through the nozzle 5 to the outlet opening 8. The redirecting channel 10 is shown with an increasing cross section through the adapter 11, but may also exhibit a constant cross section. The spray nozzle 5, which may be constituted by a sleeve with an integrated outlet opening 8, or with a separate nozzle, is by a bayonet coupling 12 detachably attached to the adapter 11. Threads could also be employed to this end. A seal (not shown) may be arranged in a groove 15 between the adapter 11 and the spray nozzle 5. Because the connection 13 extends parallel to the filter element, the bayonet coupling will also extend in this direction, and will not influence the distance in the direction perpendicular to the filter element. A through hole 16 and a socket 17 are present for enabling screwing together of two adapters around the flush tube (not shown). A semicircular recess 18 is adapted to correspond to the outside of the flush tube, but naturally, other shapes of the recess 18 would be conceivable for other types of flush tubes.

As may be seen from FIG. 3, a corresponding adapter 11 for the respective spray nozzle 5 is arranged at least partially around the flush tube 6, and comprises an outlet 9 arranged through the side of the flush tube 6 and leads the cleaning liquid from said outlet 9 to said connection 13. The spray nozzle 5 comprises a curved channel 14, which leads to an outlet opening 8, which by shifting of the respective flush tube 6 is located at a distance from the respective filter element, which is larger than half the spacing between two adjacent parallel filter elements. The spray nozzle 5 is constructed in the same way as in FIG. 1, and because the connection thus extends parallel to the filter element, the bayonet coupling 12 will also extend in this direction and will not affect the distance in the direction perpendicular to the filter element.

It will be readily appreciated that modifications of the embodiments described herein are possible within the scope of the invention, which is defined by the appended claims. The cleaning device 2 may be made in alternative ways, and may, e.g., be made up of components other than flushing ramp and flush tube 6. The cleaning device 2 may be of a smaller size than stated. The parameters used for calculating the distance between the spray nozzle 5 and the filter cloth 4 may be other than the ones stated herein. Different parts of the device, such as flushing ramp or flush tube 6 may be movable, both single parts or several in combination. Further, the cleaning device 2 may be used for cleaning other devices apart from disc filters 1.

The invention claimed is:

1. A rotary disc filter comprising: at least first and second adjacent and parallel filter elements forming a part of the rotary disc filter and including filter cloth for filtering water; a device for cleaning the filter cloth comprising at least one flush tube having a central axis that is located generally between the first and second adjacent and parallel filter elements and wherein the central axis of the flush tube lies in a plane that is parallel to the first and second parallel filter elements; outlets in the flush tube; first and second spray nozzles associated with the flush tube and operatively connected to the outlets of the flush tube for permitting cleaning liquid to flow from the flush tube to the first and second spray nozzles; each of the first and second spray nozzles including an outlet opening and an angled redirecting channel for redirecting the cleaning fluid in a direction towards the filter cloth of one of the first or second parallel filter elements; the first and second spray nozzles arranged around the flush tube; wherein the outlet opening of the first spray nozzle is directed towards the first filter element; wherein the outlet opening of the second spray nozzle is directed towards the second filter element; wherein the flush tube and the first and second spray nozzles are disposed in an operative cleaning position between and inside the first and second filter elements and wherein the first spray nozzle is operative to direct the cleaning fluid onto the first filter element and the second spray nozzle is operative to direct the cleaning fluid onto the second filter element, and wherein in said operative cleaning position, the shortest distance between the outlet opening of the first spray nozzle and the first filter element is larger than half the distance between the first and second filter elements and wherein the shortest distance between the outlet opening of the second spray nozzle and the second filter element is larger than half the distance between the first and second filter elements; and wherein the outlet openings of each of the first and second spray nozzles is located behind said plane relative to the direction of the cleaning fluid emitted by each outlet opening.

2. The rotary disc filter of claim 1 wherein the first and second spray nozzles are arranged directly on the flush tube.

3. The rotary disc filter of claim 1 wherein respective spray nozzles are detachably connected to an adapter that is supported at least indirectly by the flush tube.

4. The rotary disc filter of claim 1 wherein each outlet of the flush tube is operative to direct the cleaning fluid to a respective spray nozzle, and wherein the cleaning fluid passing through the outlet moves in a direction opposite the movement of the cleaning fluid dispersed through the outlet opening of the respective spray nozzle.

5. The rotary disc filter of claim 3 wherein the adapter includes the angled redirecting channel.

6. The rotary disc filter of claim 1 wherein the flush tube is moveable within an area defined by the circumference of the filter elements.

7. The rotary disc filter of claim 1 wherein the spacing between the first and second parallel filter elements is less than 16 cm.

8. The rotary disc filter of claim 1 wherein the outlet opening of the spray nozzles is between 7 and 8 cm from the filter cloth to be cleaned by the spray nozzles.

9. A rotary disc filter comprising:
first and second parallel filter elements with each filter element including filter cloth for filtering water;
a cleaning device for spraying a cleaning fluid onto the filter cloth, the cleaning device comprising:
  i. a flush tube having a central axis which extends between the first and second parallel filter elements and wherein the central axis of the flush tube lies in a plane that is parallel to the first and second parallel filter elements;
  ii. an outlet for permitting the cleaning fluid to flow from the flush tube;
  iii. a first spray nozzle aimed at the first filter element and operatively connected to the outlet such that the cleaning fluid flows from the flush tube through the outlet into the first spray nozzle;
  iv. an angled redirecting channel forming a part of the cleaning device for distributing the cleaning fluid in a general direction towards the first filter element that the first spray nozzle is aimed towards;
  v. the first spray nozzle including an outlet opening aimed at the first filter element; and
  vi. wherein the outlet opening of the first spray nozzle is located behind said plane relative to the first filter element and the first spray nozzle and relative to the direction of the cleaning fluid emitted by the first spray nozzle; and
wherein the flush tube and the first spray nozzle are disposed in an operative cleaning position between and inside the first and second filter elements and wherein the first spray nozzle is operative to direct the cleaning fluid from the first spray nozzle onto the first filter element and wherein in said operative cleaning position the outlet opening of the first spray nozzle is located a distance from the first filter element which is larger than half the distance between the first and second parallel filter elements.

10. The rotary disc filter of claim 9 wherein the cleaning device includes an adapter configured to be secured to the flush tube and wherein the adapter includes the outlet and the angled redirecting channel.

11. The rotary disc filter of claim 10 wherein the first spray nozzle is detachably secured to the adapter.

12. The rotary disc filter of claim 9 wherein the outlet for permitting the cleaning fluid to flow from the flush tube is oriented in a direction other than towards said first filter element that the first spray nozzle is aimed towards.

\* \* \* \* \*